United States Patent
Nanataki et al.

(10) Patent No.: US 9,951,696 B2
(45) Date of Patent: Apr. 24, 2018

(54) TWIN-SHAFT GAS TURBINE FOR MULTIPLE FREQUENCY POWER GENERATION

(71) Applicant: Mitsubishi Hitachi Power Systems, Ltd., Nishi-ku, Yokohama, Kanagawa (JP)

(72) Inventors: Kenji Nanataki, Hitachinaka (JP); Hidetaro Murata, Hitachi (JP); Hidetoshi Kuroki, Hitachi (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 584 days.

(21) Appl. No.: 13/675,481

(22) Filed: Nov. 13, 2012

(65) Prior Publication Data

US 2013/0118146 A1 May 16, 2013

(30) Foreign Application Priority Data

Nov. 15, 2011 (JP) .................................. 2011-249552

(51) Int. Cl.
*F02C 9/00* (2006.01)
*F02C 3/10* (2006.01)
(Continued)

(52) U.S. Cl.
CPC ............... *F02C 9/00* (2013.01); *F01D 15/10* (2013.01); *F01K 23/14* (2013.01); *F02C 3/10* (2013.01);
(Continued)

(58) Field of Classification Search
CPC ........... F05D 2270/061; F05D 2270/06; F05D 2270/02; F05D 2270/023; F05D 2270/05;
(Continued)

(56) References Cited

U.S. PATENT DOCUMENTS 4,442,668 A * 4/1984 Conn .......................... 60/39.281
4,733,527 A * 3/1988 Kidd ............................... 60/775
(Continued)

FOREIGN PATENT DOCUMENTS

JP 53-118614 A 10/1978
JP 53-118615 A 10/1978
(Continued)

OTHER PUBLICATIONS

English translation of Office Action mailed in connection with Japanese Patent Application 2011-249552, dated Jul. 25, 2014 (4 pages).
(Continued)

*Primary Examiner* — Gerald L Sung
*Assistant Examiner* — Alain Chau
(74) *Attorney, Agent, or Firm* — Crowell & Moring, LLP

(57) ABSTRACT

A twin-shaft gas turbine can be used for 50 and 60 Hz power generation without using a reducer. A gas generator includes a compressor that generates compressed air, a burner that burns a fuel mixed with the compressed air received from the compressor so as to generate combustion gas, and a high-pressure turbine that is rotationally driven by the combustion gas received from the burner and generates driving force for the compressor. An output turbine includes a low-pressure turbine that is driven by exhaust gas received from the high-pressure turbine and a power generator that is driven by the low-pressure turbine. A control device reduces opening degree of IGV of the compressor and thereby reduces power of the compressor, and the rotational frequency of the gas generator is increased in a full-speed no-load operating state of the power generator.

3 Claims, 2 Drawing Sheets

(51) Int. Cl.
*F01D 15/10* (2006.01)
*F01K 23/14* (2006.01)
*F02C 9/20* (2006.01)
*F02C 9/18* (2006.01)

(52) U.S. Cl.
CPC .............. *F02C 9/18* (2013.01); *F02C 9/20* (2013.01); *F05D 2270/02* (2013.01); *F05D 2270/304* (2013.01)

(58) Field of Classification Search
CPC .. F05D 2220/75; F05D 2270/024; F02C 9/28; F02C 9/42; F02C 9/18; F02C 3/10; F02C 3/22; F02C 6/08; F01D 15/10
USPC .......................................... 60/773, 793, 39.22
See application file for complete search history.

(56) References Cited

U.S. PATENT DOCUMENTS

| | | | | |
|---|---|---|---|---|
| 4,864,816 | A * | 9/1989 | Benvenuti et al. | 60/792 |
| 5,276,353 | A * | 1/1994 | Kobayashi et al. | 290/40 C |
| 6,003,298 | A * | 12/1999 | Horner | 60/39.182 |
| 6,199,366 | B1 * | 3/2001 | Murata et al. | 60/785 |
| 6,628,005 | B2 * | 9/2003 | Nelson | F01D 15/10 |
| | | | | 290/40 C |
| 7,188,475 | B2 * | 3/2007 | McGinley | F02C 7/275 |
| | | | | 60/726 |
| 7,555,890 | B2 * | 7/2009 | Kurihara et al. | 60/39.182 |
| 8,272,223 | B2 | 9/2012 | Nanataki et al. | |
| 2009/0193785 | A1 * | 8/2009 | Siden et al. | 60/39.15 |
| 2010/0005808 | A1 * | 1/2010 | Nanataki et al. | 60/773 |
| 2010/0264655 | A1 * | 10/2010 | Rosson et al. | 290/52 |
| 2010/0286889 | A1 * | 11/2010 | Childers | 701/100 |
| 2011/0126547 | A1 | 6/2011 | Nanataki et al. | |
| 2011/0167833 | A1 | 7/2011 | Kawai et al. | |
| 2011/0304159 | A1 * | 12/2011 | Juretzek | 290/40 B |
| 2012/0017600 | A1 | 1/2012 | Saito et al. | |

FOREIGN PATENT DOCUMENTS

| | | | | |
|---|---|---|---|---|
| JP | 54-28922 | A | | 3/1979 |
| JP | 54-28923 | A | | 3/1979 |
| JP | 54-28924 | A | | 3/1979 |
| JP | 2010-19165 | A | | 1/2010 |
| JP | 2010-25069 | A | | 2/2010 |
| JP | 2010-168957 | A | | 8/2010 |
| JP | 2010-216441 | A | | 9/2010 |
| JP | 2010216441 | A | * | 9/2010 ............... F02C 9/20 |
| JP | 2012-41919 | A | | 3/2012 |
| JP | 2012-67764 | A | | 4/2012 |

OTHER PUBLICATIONS

Extended European Search Report issued in counterpart European Application No. 12192560.6 dated May 8, 2017 (Seven (7) pages).

* cited by examiner

TWIN-SHAFT GAS TURBINE FOR MULTIPLE FREQUENCY POWER GENERATION

BACKGROUND OF THE INVENTION

1. Field of the Invention

The present invention relates to a twin-shaft gas turbine and more particularly to a twin-shaft gas turbine that is suitable to be used in common for 50 Hz and 60 Hz for power generation.

2. Description of the Related Art

In general, a twin-shaft gas turbine has a gas generator and a low-pressure turbine. The gas generator includes a compressor, a burner and a high-pressure turbine. The low-pressure turbine is connected to a load (power turbine). The rotating shaft (gas generator shaft) of the gas generator is separate from the rotating shaft of the low-pressure turbine (refer to, for example, JP-2010-25069-A). In the gas generator, the compressor generates compressed air and the burner burns a fuel mixed with the compressed air received from the compressor to generate combustion gas. The combustion gas generated by the burner rotationally drives the high-pressure turbine to generate driving force for the compressor. The combustion gas is then supplied to the low-pressure turbine and rotationally drives the same.

For such a twin-shaft gas turbine generally using a reducer, either of a 60 Hz power generator and a 50 Hz power generator can be driven by changing the reducer depending on the power generator. In contrast, with those directly combining a gas turbine with a power generator without using a reducer, different gas turbines are used for driving a 50 Hz power generator and a 60 power generator.

SUMMARY OF THE INVENTION

As described above, the conventional twin-shaft gas turbine does not use a reducer and has a gas turbine directly combined with a power generator, thus using different gas turbines for the 60 Hz and 50 Hz power generators. Allowing the 60 Hz and 50 Hz power generators to be used in common for a gas turbine reduces, however, the cost of development, leading to improvement in reliability and easy maintenance of the gas turbine.

When the rotational frequency of the low-pressure turbine in a no-load operating state is decreased, the rotational frequency of the gas generator also is decreased accordingly. Thus, if the 50 Hz power generator is to be driven by the gas turbine for the 60 Hz power generator, then the rotational frequency of the gas generator will be decreased. In order to avoid resonance, the gas generator has a lower limit for the rotational frequency in general. In doing so, the gas generator cannot run with the rotational frequency lower than the lower limit.

An object of the invention is to provide a twin-shaft gas turbine that can be used for a 60 Hz power generator and a 50 Hz power generator without using a reducer.

(1) In order to accomplish the aforementioned object, according to the invention, a twin-shaft gas turbine includes a gas generator, an output turbine and a control device. The gas generator includes a compressor that generates compressed air, a burner that burns a fuel mixed the compressed air received from the compressor so as to generate combustion gas, and a high-pressure turbine that is rotationally driven by the combustion gas received from the burner and generates driving force for the compressor. The output turbine includes a low-pressure turbine that is driven by exhaust gas received from the high-pressure turbine and a power generator that is driven by the low-pressure turbine. The control device is used for, during full-speed no-load operation of the power generator, increasing the rotational frequency of the gas generator in association with the rotational frequency of the low-pressure turbine.

The twin-shaft gas turbine that has the aforementioned configuration can be used for a 60 Hz power generator and a 50 Hz power generator without using a reducer.

(2) In Item (2), it is preferable that the control device increase the rotational frequency of the gas generator during full-speed no-load operation of the power generator by reducing power of the compressor.

(3) In Item (1), it is preferable that the control device increase the rotational frequency of the gas generator in the full-speed no-load operating state by increasing output of the high-pressure turbine.

(4) In Item (1), it is preferable that the control device increase the rotational frequency of the gas generator during full-speed no-load operation of the power generator by reducing output of the low-pressure turbine.

(5) In Item (2), it is preferable that the control device increase the rotational frequency of the gas generator in the full-speed no-load operating state by reducing opening degree of IGV of the compressor and thereby reducing the power of the compressor.

(6) It is preferable that the twin-shaft gas turbine described in Item (2) include a compressor extraction valve that extracts air from the compressor, and the control device increase the rotational frequency of the gas generator during full-speed no-load operation of the power generator by opening the compressor extraction valve and thereby reducing the power of the compressor.

(7) It is preferable that the twin-shaft gas turbine described in Item (2) include a motor that is connected to a shaft of the compressor, and the control device cause the motor to add power so as to reduce the power of the compressor and thereby increase the rotational frequency of the gas generator during full-speed no-load operation of the power generator.

(8) In Item (7), it is preferable that as the motor, a motor that is used upon activation be used.

(9) In Item (3), it is preferable that the control device increase the rotational frequency of the gas generator during full-speed no-load operation of the power generator by reducing an opening degree of a valve for adjusting the amount of cooling air and thereby increasing output of the high-pressure turbine.

(10) It is preferable that the twin-shaft gas turbine described in Item (4) include an exhaust gas duct damper that is arranged on a path through which exhaust gas output from the low-pressure turbine flows, and the control device increase the rotational frequency of the gas generator during full-speed no-load operation of the power generator by reducing an opening degree of the exhaust gas duct damper and thereby reducing output of the low-pressure turbine.

(11) It is preferable that the twin-shaft gas turbine described in Item (4) include a fuel gas compressor that is connected to a shaft of the low-pressure turbine, and the fuel gas compressor reduce output of the low-pressure turbine so as to increase the rotational frequency of the gas generator during full-speed no-load operation of the power generator.

(12) It is preferable that the twin-shaft gas turbine described in Item (4) include a steam turbine that is connected to a shaft of the low-pressure turbine, and the control device increases the rotational frequency of the gas generator during full-speed no-load operation of the power generator by increasing pressure of a condenser included in the steam turbine and thereby reducing output of the low-pressure turbine.

Even when the rotational frequency of the low-pressure turbine during no-load operation of the power generator is reduced from 60 Hz to 50 Hz, a reduction in the rotational frequency of the gas generator can be suppressed. Thus, the gas turbine can be used for a 60 Hz power generator and a 50 Hz power generator.

DESCRIPTION OF THE PREFERRED EMBODIMENTS

The configuration and operations of a twin-shaft gas turbine 20 according to an embodiment of the invention will be described below with reference to FIGS. 1 to 3.

Figure 1:
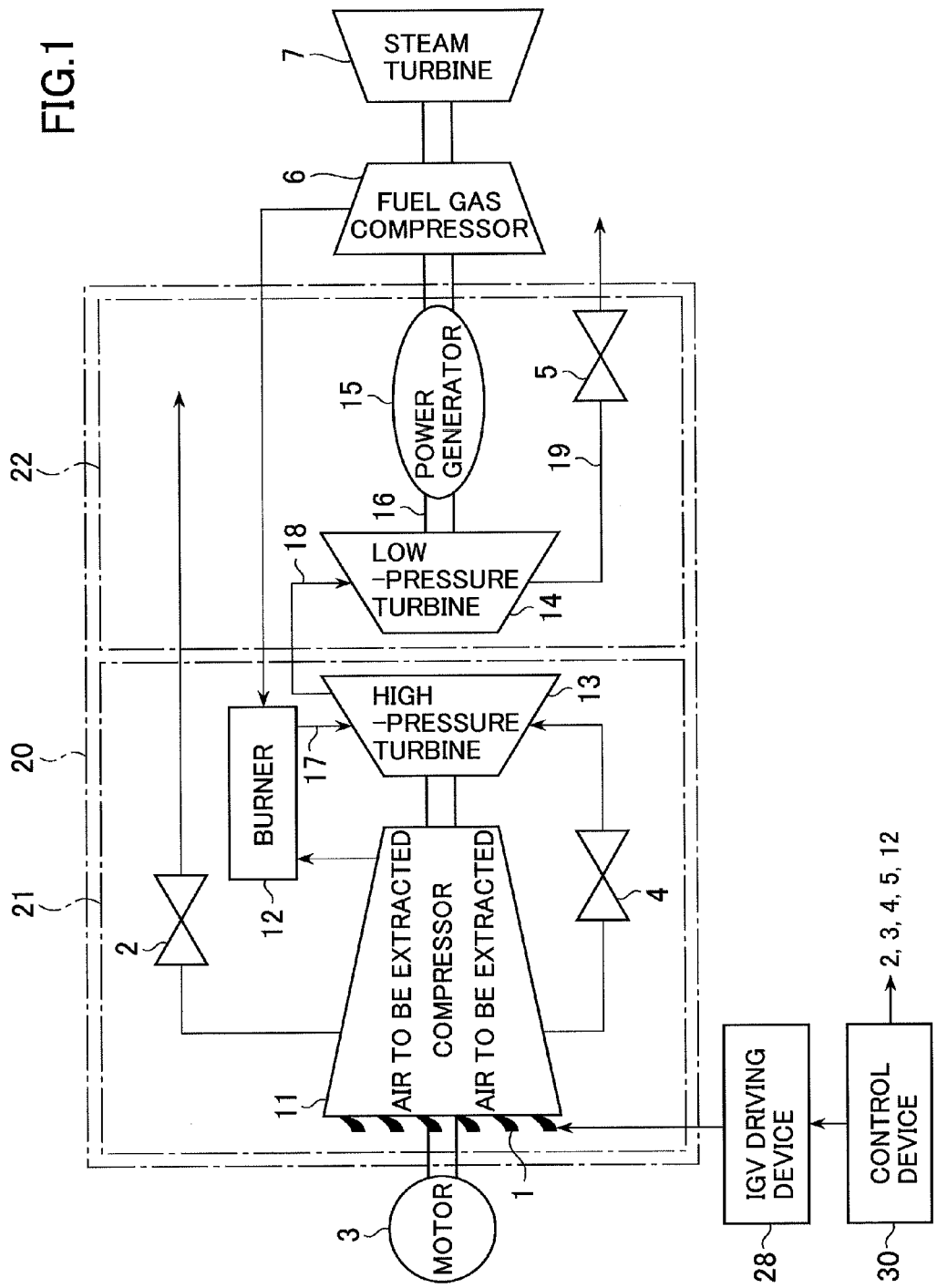
FIG. 1 is a diagram illustrating a configuration of a twin-shaft gas turbine according to an embodiment of the invention.

First, the configuration of the twin-shaft gas turbine 20 according to the embodiment is described using FIG. 1.

FIG. 1 is a diagram illustrating the configuration of the twin-shaft gas turbine 20 according to the embodiment.

The twin-shaft gas turbine 20 according to the embodiment includes a gas generator 21 and an output turbine 22.

The output turbine 22 has a low-pressure turbine 14 and a power generator 15 as main elements. The power generator 15 is connected to the low-pressure turbine 14 through an output turbine shaft 16 that is a rotor for the low-pressure turbine 14.

The gas generator 21 has a compressor 11, a burner 12 and a high-pressure turbine 13 as main elements.

The compressor 11 compresses air received from an atmosphere and thereby generates the compressed air. The compressor 11 has inlet guide vanes (IGVs) 1 on the side from which the air is input to the compressor 11. An IGV driving device 28 adjusts opening degree of the IGV 1 and thereby controls the amount of air to be input to the compressor 11.

The burner 12 burns a fuel mixed with the compressed air received from the compressor 11 so as to generate combustion gas 17.

The high-pressure turbine 13 can transmit driving force to the compressor 11 through a gas generator shaft that is a rotor for the high-pressure 13. The high-pressure turbine 13 is rotationally driven by the combustion gas 17 received from the burner 12 and generates the driving force for the compressor 11. Exhaust gas 18 that has been used to rotationally drive the high-pressure turbine 13 and has reduced pressure is transmitted from the high-pressure turbine 13 to the low-pressure turbine 14 and rotationally drives the low-pressure turbine 14.

Next, a control principle of the twin-shaft gas turbine 20 according to the embodiment of the invention is described with reference to FIGS. 2 and 3, while being compared with a conventional exemplary twin-shaft gas turbine.

Figure 2:
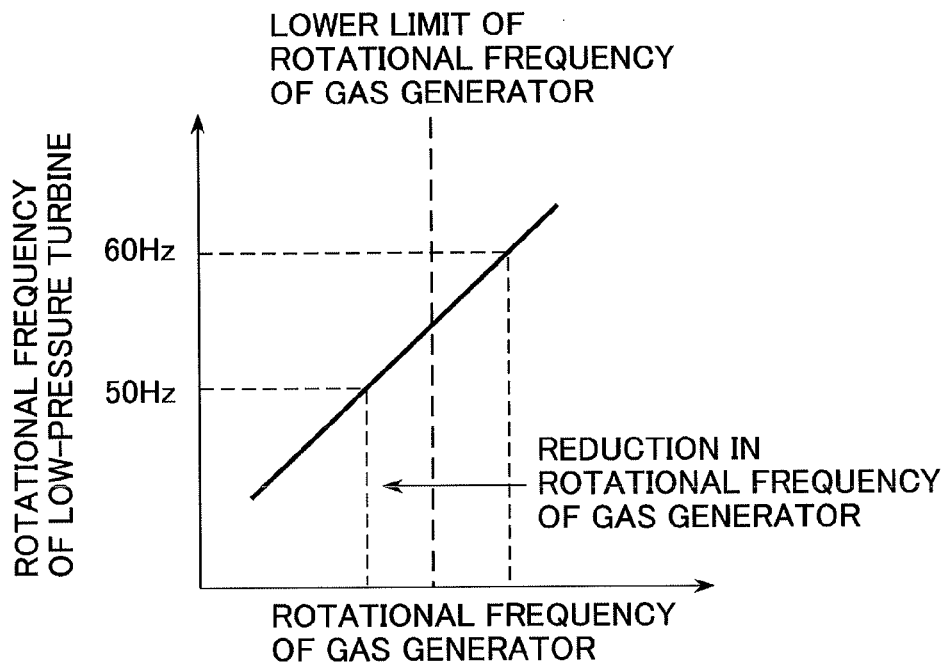
FIG. 2 is a diagram describing a control operation of a conventional exemplary twin-shaft gas turbine.

FIG. 2 is a diagram describing a control operation of the conventional exemplary twin-shaft gas turbine. FIG. 3 is a diagram describing a control operation of the twin-shaft gas turbine 20 according to the embodiment of the invention.

Regarding the conventional twin-shaft gas turbine combining a gas turbine with a power generator without using a reducer, different gas turbines are used for a 50 Hz power generator and a 60 Hz power generator. If the 60 Hz and 50 Hz power generators can be used in common for a gas turbine, however, the cost of development will be reduced, leading to improvement in reliability and easy maintenance of the gas turbine.

FIG. 2 illustrates a balance in a no-load operating state, while the abscissa indicates a rotational frequency of a gas generator and the ordinate indicates a rotational frequency of a low-pressure turbine. As illustrated in FIG. 2, when the rotational frequency of the low-pressure turbine in a no-load operating state is reduced, the rotational frequency of the gas generator is reduced. Thus, if the 50 Hz power generator is to be driven by the gas turbine for the 60 Hz power generator, then the rotational frequency of the gas generator will be decreased. In order to avoid resonance, the gas generator has a lower limit for the rotational frequency in general (illustrated in FIG. 2). In doing so, the gas generator cannot run with the rotational frequency lower than the lower limit.

Figure 3:
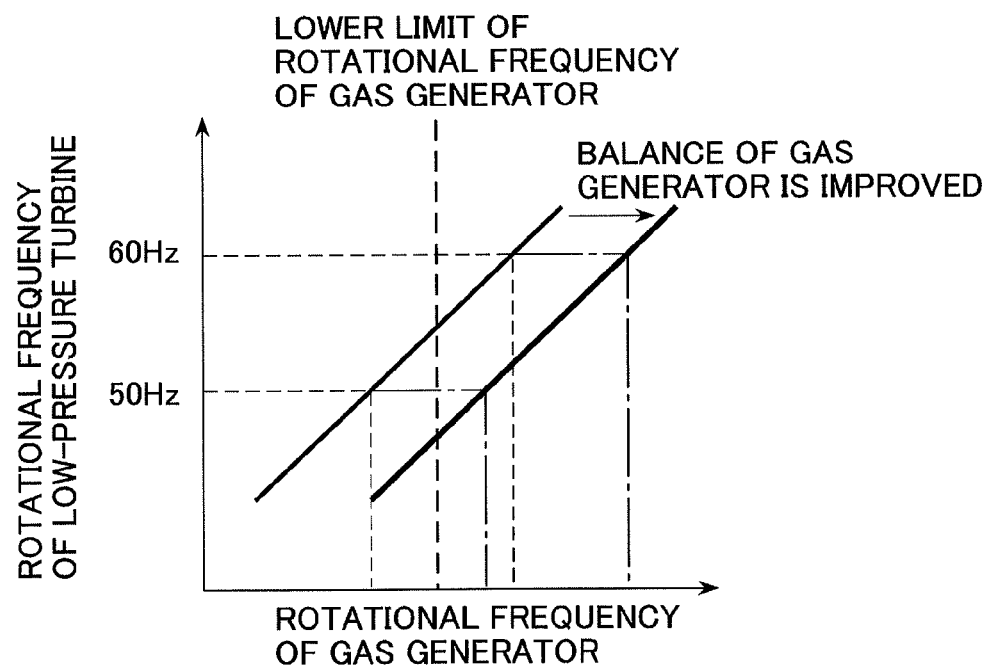
FIG. 3 is a diagram describing a control operation of the twin-shaft gas turbine according to the embodiment of the invention.

FIG. 3 illustrates a balance in a no-load operating state, in which the abscissa indicates the rotational frequency of the gas generator 21 and the ordinate indicates the rotational frequency of the low-pressure turbine 14. As illustrated in FIG. 3, the aforementioned problem can be solved by improving the balance of the gas generator 21 and thereby increasing the rotational frequencies of the gas generator 21 in association with the rotational frequencies of the low-pressure turbine 14. In addition, the aforementioned problem can be solved by reducing the rotational frequency of the low-pressure turbine 14 in association with the rotational frequency of the gas generator 21.

A control device 30 illustrated in FIG. 1 enables the gas generator 21 to be used for a 60 Hz power generator and a 50 Hz power generator without a reducer by (1) increasing the rotational frequency of the gas generator 21 in association with the rotational frequency of the low-pressure turbine 14 or by (2) reducing the rotational frequency of the low-pressure turbine 14 in association with the rotational frequency of the gas generator 21.

Details of control to be executed by the control device 30 are described below.

The rotational frequency of the gas generator 21 is increased in association with the rotational frequency of the low-pressure turbine 14, while the power generator is in a full-speed no-load operating (FSNL) state. In order to increase the rotational frequency of the gas generator 21, the energy of the exhaust gas 18 is generated by the gas generator 21. The rotational frequency of the gas generator 21 in the FSNL state is increased by reducing power of the compressor 11. In other words, the energy of the exhaust gas 18 output from the gas generator 21 is reduced in association with the rotational frequency of the gas generator 21.

As a first method, the control device 30 controls the IGV driving device 28 so as to reduce the opening degree of the IGV 1 and thereby reduce the amount of the gas flowing from the gas generator 21 and reduces the amount of the fuel necessary to maintain the rotational frequency of the gas generator 21 so as to reduce the energy of the exhaust gas 18 output from the gas generator 21.

As a second method, the control device 30 reduces the amount of the gas flowing from the gas generator 21 by opening a compressor extraction valve 2 and releasing a part of air extracted by the compressor 11 to the outside of the twin-shaft gas turbine 20 and reduces the energy of the exhaust gas 18 output from the gas generator 21 by reducing the amount of the fuel necessary to maintain the rotational frequency of the gas generator 21.

If pressure of the air extracted by the compressor 11 increases, the amount of the fuel, which is necessary to maintain the rotational frequency of the gas generator 21 when the compressor extraction valve 2 is opened, may increase and exceed the amount of the fuel when the compressor extraction valve 2 is closed. However, if an increase in the energy of the exhaust gas 18, which is caused by the increase in the amount of the fuel, is lower than the reduction in the energy of the exhaust gas 18, which is caused by the reduction in the amount of the fuel, a positive effect can be obtained.

As a third method, the control device 30 causes the motor 3 to add power so as to reduce power of the compressor 11, reduces the amount of the fuel necessary to maintain the rotational frequency of the gas generator 21 and thereby reduces the energy of the exhaust gas 18 output from the gas generator 21. In this case, as the motor 3, a motor that is used upon activation can be used.

As another method, output of the high-pressure turbine 13 is increased in order to increase rotational frequency of the gas generator 21, during full-speed no-load operation (FSNL) of the power generator, in association with the rotational frequency of the low-pressure turbine 14.

As a fourth method, the control device 30 increases output of the high-pressure turbine 13 by reducing an opening degree of a valve 4 for adjusting the amount of cooling air and reduces the energy of the exhaust gas 18 output from the gas generator 21 by reducing the amount of the fuel necessary to maintain the rotational frequency of the gas generator 21.

Alternatively, output of the low-pressure turbine 13 is reduced in order to increase rotational frequency of the gas generator 21, during full-speed no-load operation (FSNL) of the power generator, in association with the rotational frequency of the low-pressure turbine 14.

As a fifth method, the control device 30 reduces an opening degree of an exhaust gas duct damper 5 so as to increase an exhaust air pressure drop in the low-pressure turbine 14, increases a loss of a steam turbine 7 and increases a load of the low-pressure turbine 14.

As a sixth method, a fuel gas compressor 6 may be provided, and the control device 30 increases a loss of the steam turbine 7 and increases a load of the low-pressure turbine 14.

As a seventh method, the steam turbine 7 may be provided, and the control device 30 increases a loss of the steam turbine 7 by increasing pressure in a condenser included in the steam turbine 7 and increases a load of the low-pressure turbine 14.

The aforementioned first to seventh methods may be individually executed. Two or more of the first to seventh methods may be simultaneously executed.

For example, the first method of reducing the opening degree of the IGV 1 and the second method of releasing a part of air extracted by the compressor 11 to the outside of the twin-shaft gas turbine 20 by opening the compressor extraction valve 2, may be combined so as to achieve the reduction in the opening degree of the IGV 1 or the increase in the amount of air to be extracted by the compressor 11 while maintaining the reliability of the compressor 11 (or maintaining a surge margin).

While the invention has been described in its preferred embodiments, it is to be understood that the words which have been used are words of description rather than limitation and the invention may be achieved in other various embodiments without departing from the spirit of the invention.

According to the embodiment, it is possible to suppress a reduction in the rotational frequency of the gas generator when the rotational frequency of the low-pressure turbine, in the no-load operating state of the power generator, is reduced from 60 Hz to 50 Hz. Thus, the twin-shaft gas turbine 20 can be used for both 60 Hz power generator and 50 Hz power generator.

What is claimed is:

1. A twin-shaft gas turbine for multiple frequency power generation comprising:
    a gas generator that includes a compressor that generates compressed air, a burner that burns a fuel mixed with the compressed air received from the compressor to generate combustion gas, and a high-pressure turbine that is rotationally driven by the combustion gas received from the burner and generates driving force for the compressor; wherein the gas generator rotates at a rotational frequency that is a first rotational frequency during full-speed no-load operation of a power generator when the power generator runs at 60 Hz, and the gas generator rotates at a second rotational frequency during full-speed no-load operation of the power generator when the power generator runs at 50 Hz, the second rotational frequency being lower than the first rotational frequency;
    an output turbine that includes a low-pressure turbine that is driven by exhaust gas received from the high-pressure turbine and the power generator is driven by the low-pressure turbine; wherein the low pressure turbine rotates at a third rotational frequency during full-speed no-load operation of the power generator when the power generator runs at 50 Hz;
    an inlet guide vane (IGV) for controlling the amount of air to be input from an atmosphere to the compressor;
    a compressor extraction valve that releases a first portion of compressed air extracted from the compressor to the outside of the twin-shaft gas turbine;
    a valve for adjusting an amount of cooling air that supplies a second portion of the compressed air extracted from the compressor to the high-pressure turbine as cooling air; and
    a control device configured to perform control to increase the rotational frequency of the gas generator during full-speed no-load operation of the power generator at 50 Hz from the second rotational frequency to a fourth rotational frequency, with the low-pressure turbine kept at the third rotational frequency by reducing an IGV opening degree of the compressor and opening the compressor extraction valve, wherein
    the fourth rotational frequency of the gas generator during the full-speed no-load operation is higher than a resonance rotational frequency of the gas generator when the power generator runs at 50 Hz.

2. A twin-shaft gas turbine for multiple frequency power generation comprising:
    a gas generator that includes a compressor that generates compressed air, a burner that burns a fuel mixed with the compressed air received from the compressor to generate combustion gas, and a high-pressure turbine that is rotationally driven by the combustion gas received from the burner and generates driving force for the compressor; wherein the gas generator rotates at a rotational frequency that is a first rotational frequency during full-speed no-load operation of a power generator when the power generator runs at 60 Hz, and the gas generator rotates at a second rotational frequency during full-speed no-load operation of the power generator when the power generator runs at 50 Hz, the second rotational frequency being lower than the first rotational frequency;

an output turbine that includes a low-pressure turbine that is driven by exhaust gas received from the high-pressure turbine and the power generator is driven by the low-pressure turbine; wherein the low pressure turbine rotates at a third rotational frequency during full-speed no-load operation of the power generator when the power generator runs at 50 Hz;

a motor that is connected to a shaft of the compressor;

a compressor extraction valve that releases a first portion of compressed air extracted from the compressor to the outside of the twin-shaft gas turbine;

a valve for adjusting an amount of cooling air that supplies a second portion of the compressed air extracted from the compressor to the high-pressure turbine as cooling air; and a control device configured to perform control to increase the rotational frequency of the gas generator during full-speed no-load operation of the power generator at 50 Hz from the second rotational frequency to a fourth rotational frequency, with the low-pressure turbine kept at the third rotational frequency, wherein the fourth rotational frequency of the gas generator during the full-speed no-load operation is higher than a resonance rotational frequency of the gas generator when the power generator runs at 50 Hz.

3. The twin-shaft gas turbine according to claim 2, wherein as the motor, a motor that is used upon activation is used.

* * * * *